United States Patent [19]

Erlebach

[11] Patent Number: 5,573,096
[45] Date of Patent: Nov. 12, 1996

[54] SHIFTING DEVICE FOR A POSITIVELY ENGAGING CLUTCH AND A PROCESS FOR ITS ADJUSTMENT

[75] Inventor: Friedrich Erlebach, Steyr, Austria

[73] Assignee: Steyr-Daimler-Puch AG, Wien, Austria

[21] Appl. No.: 385,313

[22] Filed: Feb. 8, 1995

[30] Foreign Application Priority Data

Feb. 10, 1994 [AT] Austria ........................ 255/94

[51] Int. Cl.⁶ .................... F16D 11/10; F16D 25/08
[52] U.S. Cl. ............... 192/110 R; 192/69.8; 192/85 C
[58] Field of Search ............... 192/110 R, 69.8, 192/69, 85 C, 82 R, 109 R

[56] References Cited

U.S. PATENT DOCUMENTS

| 3,788,157 | 1/1974 | Carlson et al. | 192/82 R X |
| 4,529,080 | 7/1985 | Dolan | 192/82 R X |
| 4,573,366 | 3/1986 | Kennard | 192/85 C X |
| 5,335,764 | 8/1994 | Leitner et al. | 192/85 C |

FOREIGN PATENT DOCUMENTS

| 4113128 | 10/1992 | Germany . | |
| 1299841 | 3/1987 | U.S.S.R. | 192/85 C |

*Primary Examiner*—Charles A. Marmor
*Assistant Examiner*—Saul Rodriguez
*Attorney, Agent, or Firm*—Meltzer, Lippe, Goldstein, et al.

[57] ABSTRACT

A shifting device of a positively engaging clutch, such as a dog clutch, in a housing of a differential or transfer case comprises a shift fork for axial displacement of one of the coupling elements of the dog clutch, and an actuator with an actuator rod which supports the shift fork and causes it to engage against one of the coupling elements. For precise adjustment of the stroke position and the stroke of the actuator, an adjusting element is disposed between the actuator and the shift fork. The adjusting element has a surface which constitutes a stop surface for a hub of the shift fork. The axial position of the adjusting element may be adjusted by threads which mesh with internal threads of the housing.

8 Claims, 3 Drawing Sheets

5,573,096

SHIFTING DEVICE FOR A POSITIVELY ENGAGING CLUTCH AND A PROCESS FOR ITS ADJUSTMENT

FIELD OF THE INVENTION

The instant invention relates to a shifting device for a positively engaging clutch, such as a dog clutch. Particularly, the invention relates to a device comprising a shift fork for axial shifting of a coupling part, an actuator rod supporting the shift fork, and an actuator which causes the actuator rod to move. The actuator may be a fluid cylinder and is preferably a compressed-air cylinder or a solenoid. The dog clutch is designed to lock axle differentials or longitudinal differentials in a transfer case for motor vehicles.

BACKGROUND OF THE INVENTION

Differentials having dog clutches and shifting devices are known from DE-OS 41 13 128 (U.S. Pat. No. 5,335,764). In the shifting device shown in FIG. 4 of that patent, the shift fork is welded to the actuator rod, but it could also be adjustably connected by a locking screw. In either case, it is disadvantageous that the stroke and stroke position of the actuator cannot be exactly adjusted.

Such a disadvantage leads to many different consequences. The actuator has to cover an unnecessary long idle path, so that meshing is delayed. If the coupling is not fully engaged, even very small deviations cause an inferior contact pattern and increased wear. The shift fork and actuator rod are subjected to bending stress by the full force of the actuator when the two coupling parts meet in the axial direction. Therefore, it is necessary to exactly adjust the stroke and stroke position, which cannot be done in the conventional systems. Because of the long chain of tolerances in the conventional systems, the adjustment which is necessary when assembling the coupling can be made only very approximately. Corrective adjustment must be easily possible in order to compensate for wear.

SUMMARY OF THE INVENTION

According to the instant invention, precise adjustment of the stroke position and the actuator stroke is provided for by an adjustment plate connected to the actuator on the fork side. The axial position of the adjustment plate relative to the housing is adjustable by means of threads. The adjustment plate comprises a stop for the shift fork.

Very simple and precise adjustment of the stroke position is provided by the adjustment plate. The actuator rod is protected from bending and wear because the adjustment plate acting as a stop surrounds the actuator rod. Axial impact of the coupling claws which causes the bending is only truly prevented by this precise adjustability.

In an advantageous embodiment, a second stop is connected to the adjusting element on the side away from the shift fork. The second stop interacts with a first shoulder of the actuator rod on the inside of the actuator. In this manner, an exact stop in both directions of movement is provided with minimum expenditure. Therefore, the stroke position and stroke can be adjusted exactly. It is possible to obtain a minimal idle path and, therefore, to obtain the shortest possible engaging time which is very desirable in electronic coupling control.

In another embodiment of the invention, the second stop comprises a separate stop ring surrounding the actuator rod. The actuator is suitable for different couplings or can easily be adapted at the testing stage and manufacture and storage of components is simplified. Precise adjustment by means of the adjusting plate makes it possible to fixedly join the shift fork to the actuator rod even in double action actuators.

In another advantageous embodiment of the invention, a single-action actuator and a compression spring acting in opposition to the actuator are provided. The actuator rod is provided with a second shoulder. The second shoulder is turned on one side towards the shift fork, while the compression spring surrounding the actuator rod acts upon the other side of the shift fork. In this embodiment, no fixed connection between the shift fork and the actuator rod is necessary. The shift fork is pushed in one direction by the second shoulder and in the other direction by the compression spring. This arrangement simplifies the assembly and allows the shift fork to optimally adjust itself by swivelling around the longitudinal axis of the actuator rod in relation to a circumferential slot or groove which it engages.

In another embodiment of the invention, a process for the adjustment of the stroke and stroke position of an actuator of the shift fork of a dog clutch is provided. An adjusting element is connected after the actuator on the fork side. Its axial length is adjustable in relation to the housing by means of threads. The shift fork engages a circumferential slot of one of the coupling elements.

In the inventive process, the required stroke of the actuator is first calculated. In this calculation, the only tolerance that needs to be taken account of is the clearance of the shift fork in the circumferential slot because in the next step the shift fork is brought into a position in which the two coupling elements face each other tooth to tooth. The adjusting element is displaced until a first stop surface lies against the surface of the hub. Thus, all the other tolerances and clearances in the chain of tolerances are automatically taken into account. The adjusting element is screwed in to abut against the shift fork and then screwed out by a required angle which corresponds to the axial clearance of the disengaged coupling. The adjusting element is then secured against any further rotation. Therefore, the stroke, which is thus determined very precisely, only requires machining of the second stop of the adjusting element.

In another embodiment of the inventive process, a separate contact ring may be machined to the required length before the installation of the actuator and fork.

BRIEF DESCRIPTION OF THE DRAWINGS

The invention is described and explained below through the following drawings.

DETAILED DESCRIPTION OF THE INVENTION

Figure 1:
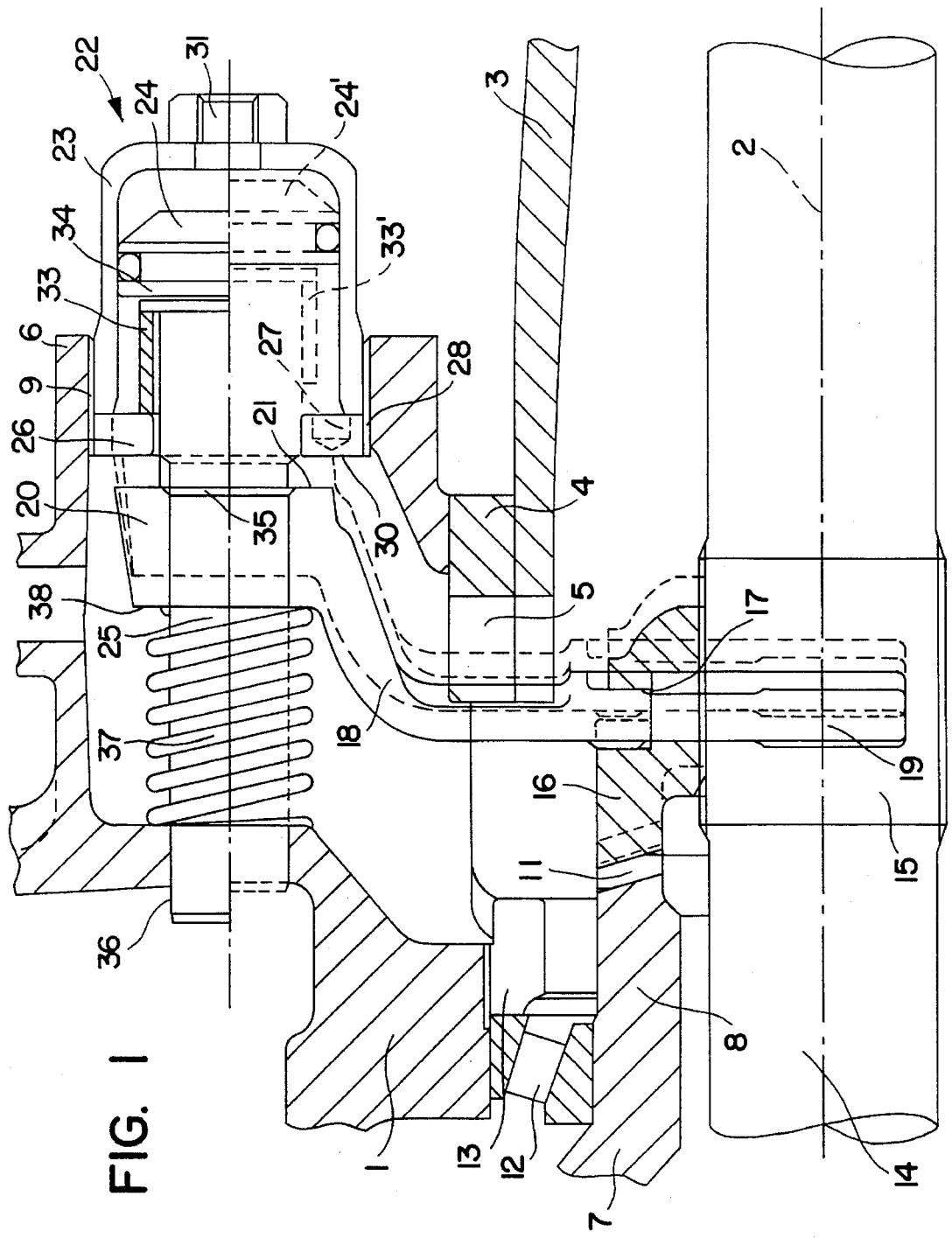
FIG. 1 shows a first embodiment of the shifting device according to the invention in a longitudinal section.

In FIG. 1 part of the housing of an axle differential bears reference number 1; this may also be the housing of a longitudinal differential, e.g., as part of a transfer case. The housing is divided along a plane perpendicular to the section shown containing the dashed line 2. An axle housing or tube 3 having a flange ring 4 is welded or screwed into the housing 1 on the right side of FIG. 1. The axle housing 3 has a recess 5 in the vicinity of the shift fork 18. A flange 6 having internal threads 9 is formed inside housing 1 in front of or above the axle housing 3.

The differential, which is not shown, is located on the left side of the housing 1. The differential casing 7 of the differential continues into a sleeve-like first coupling element 8 and ends in protruding claws 11 of the dog clutch. This first coupling element 8 is supported in roller bearings of which only one roller bearing 12 is shown. The roller bearing is supported in the axial direction on a locking ring 13. An axle shaft 14 provided with splines 15 extends out of the differential. On the other or left side of the differential a second axle shaft, which is not shown, follows.

The differential can be locked by positively-engaging the coupling elements 8, 16. To lock the differential it suffices to connect the differential casing 7 to a single axle shaft, i.e., to axle shaft 14.

A second coupling element 16 comprises a sleeve capable of being displaced on the splines 15 of the axle shaft 14. It also comprises claws, which fit into the clutch claws 11 of the first coupling element 8, and a circumferential slot 17 into which a shift fork 18 engages its fork element 19. On the other end of the shift fork 18 is a hub 20. The side of the hub 20 facing the flange 6 is provided with a surface 21 which is perpendicular to the axle 14. An actuator 22 is mounted in the flange 6. The actuator 22 comprises a housing 23 screwed into the flange 6, a piston 24 and an actuator rod 25 which extends beyond the housing 23 and which passes through and is surrounded by the hub 20 of the shift fork 18.

An adjusting element 26 is screwed into the flange 6 after the actuator 22. The adjusting element is provided with bores 27, e.g., for the insertion of an adjustment tool. The adjusting element 26 comprises a first stop face 30 located on a side facing the shift fork 18. The first stop face 30 interacts with the surface 21 of hub 20 which is perpendicular to the axle 14 when the coupling is disengaged, as shown by the broken line. On the other side of the adjusting element 26, a stop ring 33 is located which serves as a second stop for the adjusting element. The stop ring 33 interacts with a first shoulder 34 of the actuator rod when the coupling is engaged in accordance with the position of the shift fork 18, as shown by the solid lines.

In the embodiment shown in FIG. 1, the actuator rod is provided with a second shoulder 35 which also interacts with the surface 21 of hub 20. The actuator rod 25 extends into and is guided in a bore 36 of housing 1 at an end away from the actuator 22. A compression spring 37 acts between the housing and a surface 38 of hub 20 of the shift fork 18. The surface 38 is perpendicular to the axle 14.

In the embodiment of FIG. 1, the actuator is single action in the direction of engagement, as indicated by the connection 31 for the pressure fluid. The spring 37 shifts the coupling out of engagement when no torque is being transmitted. The hub 20 is thus pressed by the spring 37 against the shoulder 35. Therefore, the hub 20 need not be fixedly connected to the actuator rod 25; a light sliding fit will suffice. The advantages of the invention are to a great extent the same if the actuator 22 is double action and if the hub 20 is fixedly connected to the actuator rod 25, aside from the additional free adjustability of the shift fork 18 around the axle of the actuator rod 25.

In the embodiment of FIG. 1, the actuator 22 is a pneumatic cylinder. However, it can also be a hydraulic cylinder or an electromagnetic solenoid.

Figure 2:
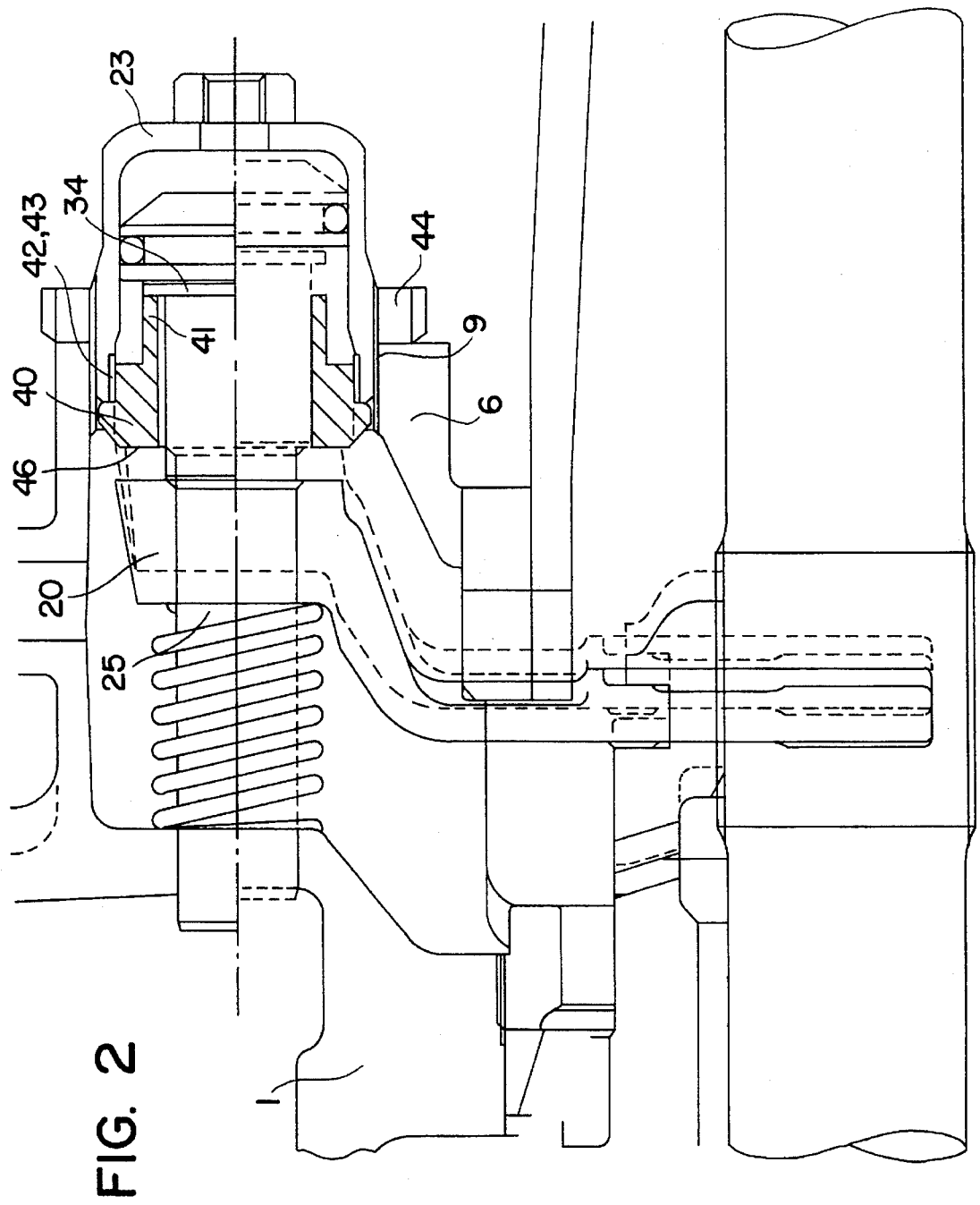
FIG. 2 shows a second embodiment of the shifting device according to the invention in a longitudinal section.

The embodiment of FIG. 2 is different from that of FIG. 1 in the design of the adjusting element. Here, the adjusting element 40 is provided with a collar 41. The collar 41 is integral with the adjusting element piece and constitutes a second stop for the shoulder 34 of the actuator rod 25. The displacement of the adjusting element together with the entire pre-assembled actuator 22 in relation to the housing 1 is achieved by screwing the actuator housing into the internal threads 9. The entire pre-assembled actuator 22 comprises the actuator housing 23 and adjusting element 40 which are fixedly connected to each other by screwing the outer threads 42 of adjusting element 40 into the internal threads 43 of the actuator housing 23. In this manner, the stroke position can be adjusted from the outside. Securing of the actuator housing is accomplished by means of a locking nut 44. The first stop face 46 of the adjusting element 40 interacts with the hub 20, as described above, and the second shoulder or contact surface 34 of the actuator rod interacts directly with the collar 41.

Figure 3:
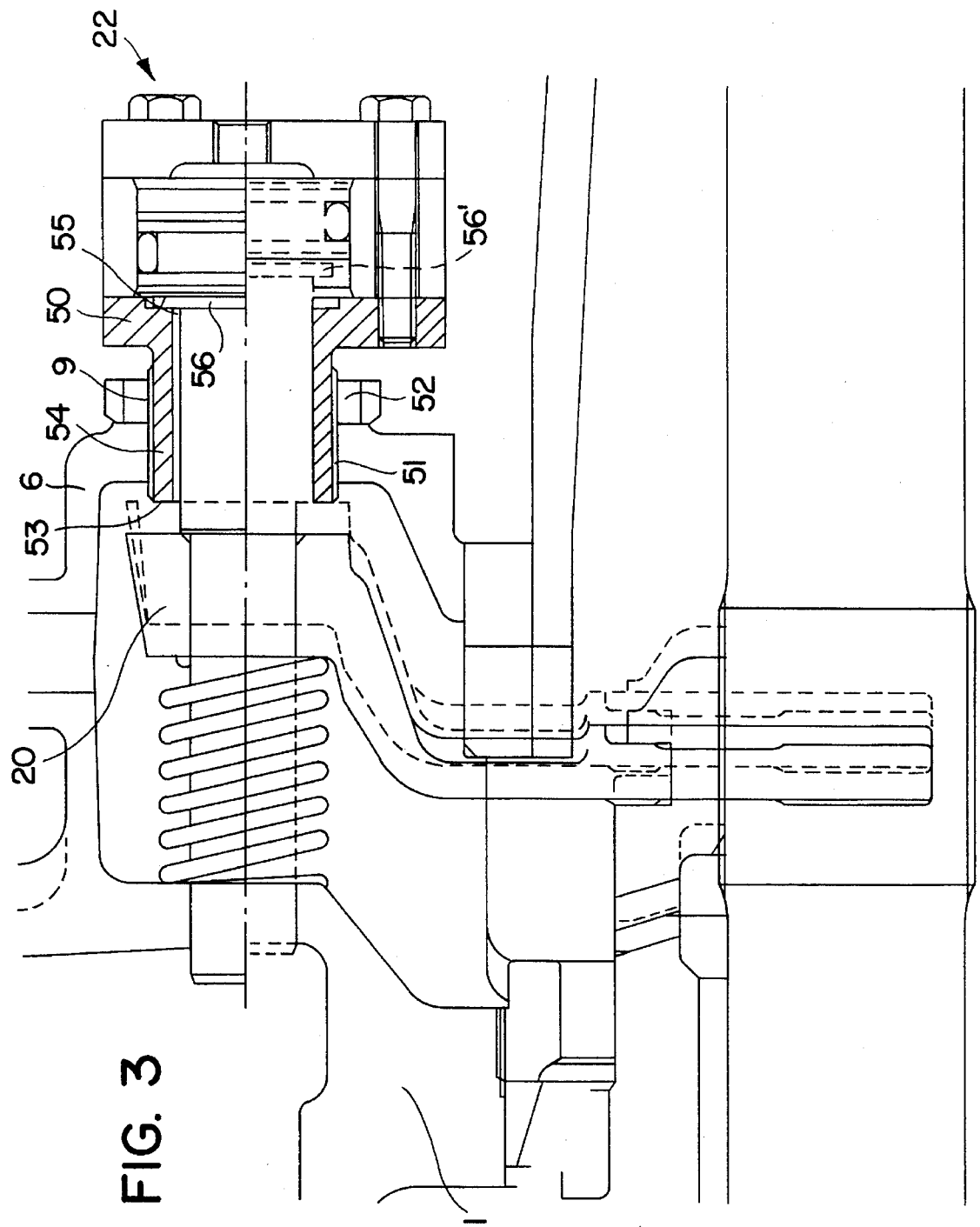
FIG. 3 shows a third embodiment of the shifting device according to the invention in a longitudinal section.

The embodiment shown in FIG. 3 also differs from FIG. 1 in the design of the adjusting element 50. This adjusting element 50 is fixedly screwed to the actuator 22 by being screwed into threads 51 of flange 6 of the housing. The adjusting element 50 is secured with a locking nut 52. The adjusting element 50 has a collar 54 which extends towards hub 20 and is provided with threads 51 which end at the first stop face 53. On the side of the adjusting element facing the actuator 22, a second stop face 55 interacts with a shoulder 56 of the actuator rod 25. FIGS. 2 and 3 also show the disengaged position with thin broken lines and an apostrophe (56') is added to the reference numbers.

The process for adjustment of the adjusting device during assembly shall now be explained with reference to FIG. 1.

First, the required stroke in the axial direction is calculated on the basis of the length of the coupling claws 11 in the axial direction and the clearance between the fork element 19 in the circumferential slot 17, the stop ring 33 being selected so as to have a width which, when added to the width of the adjusting element 26 in the adjusting direction, allows for the calculated stroke. A separate stop ring is advantageous because it can easily be changed to have the correct width without having to machine the adjusting element itself.

In order to install the adjusting device, the adjusting element 26 is first screwed into the housing and the actuator rod is inserted through the adjusting element 26, the hub 20 of the shift fork 18 and the spring 37 into the housing. The shift fork 18 is then shifted to the left as shown, together with the second coupling element 16 until the faces of the projecting claws 11 of both coupling elements 8, 16 touch each other. This is the position in which the coupling cannot be engaged because the claws are positioned "head to head" or "tooth to tooth" so to speak. In this position, i.e., the calibration position, the clearance between the fork element 19 and circumferential slot 17 is exhausted on one side and all tolerances of the chain of tolerances extending from the shift fork 18 via the coupling elements 16, 8, the roller bearing 12, the housing 1 and the actuator rod 25 or the adjusting element 26 are taken into account.

Next, the adjusting element 26 is screwed until the first stop face 30 of the adjusting element presses against the surface 21 of hub 20 which is perpendicular to the axle 14. With reference to FIG. 1, the adjusting element 26 is screwed so as to move to the left. Then the adjusting element is backed away from surface 21 by the desired, very minimal axial clearance of the disengaged claws by rotating the adjustment element 26 in the opposite direction by a given angle and is secured against further rotation. As a rule the given angle represents less than one full revolution. The adjusting element 26 is now in the position indicated by a solid line in FIG. 1. The coupling element 16 and the shift fork 18 are in positions indicated by broken lines. The desired stroke position has now been adjusted while taking into account all tolerances and clearances due to the assumed calibration position. The actuator housing 23 is also screwed into the internal threads 9 and locked by the secured adjusting element 26.

The automatic and electronic triggering of the coupling requires a very precise prior establishment of stroke and stroke position. Due to the precise stroke and stroke position and the design of the actuating device of the present invention, no measuring devices or gauges are needed during assembly of the device.

While the invention has been described by reference to specific embodiments, this was for purposes of illustration only. Numerous alternative embodiments will be apparent to those skilled in the art and are considered to be within the scope of the invention.

I claim:

1. Shifting device for a positively engaging clutch having first and second positively engaging coupling elements, said shifting device comprising a housing, a shift fork having a fork element engageable against said first coupling element for axial displacement of said first coupling element into engagement with said second coupling element, and a hub, said fork element and said hub being integral parts of said shift fork, an actuator including an actuator rod which supports said shift fork and causes it to engage against said first coupling element, and an adjusting element disposed between said actuator and said hub of said shift fork, said adjusting element having a surface facing said hub of said shift fork and which constitutes a first stop for said hub, the axial position of said adjusting element being adjustable by means of threads on said adjusting element.

2. The shifting device of claim 1 further comprising a second stop disposed on a side of said adjustment element which faces away from said hub and interacts with a first shoulder of said actuator rod.

3. The shifting device as in claim 2, wherein said second stop comprises a stop ring surrounding said actuator rod.

4. The shifting device as in claim 3, wherein said actuator is single action and further comprising a compression spring acting in opposition to said actuator, and wherein said actuator rod has a second shoulder facing towards and interacting with a first surface of said hub, said compression spring surrounding said actuator rod and acting upon a second surface of said hub.

5. A process for adjusting the stroke of an actuator of a shift fork associated with a positively engaging clutch having first and second coupling elements each of which has claws, wherein an adjusting element is disposed between the actuator and the shift fork, the axial position of the adjusting element being adjustable by means of threads, and wherein said shift fork engages into a circumferential slot of one of said coupling elements, said process comprising, a) determining the required stroke length of said actuator based on the dimensions of the claws and the clearance of said shift fork in said slot, b) bringing said shift fork into a position in which said first and second coupling elements are positioned so that said claws of said first coupling element contact but do not engage said claws of said second coupling element, c) displacing said adjusting element towards said shift fork until a first stop surface of said adjusting element lies against a surface of said shift fork, d) screwing said adjustment element away from said shift fork by a given angle, wherein said given angle corresponds to the axial clearance of said claws when said coupling elements are disengaged, and e) securing said adjusting element and said actuator against further displacement in a housing.

6. The process of claim 5, further comprising, placing a separate stop ring over an actuator rod of said actuator rod before installation of said actuator and said shift fork, said stop ring having a width which, when added to the width of said adjusting element, allows for the required stroke of said actuator.

7. The shifting device of claim 1 wherein each of said first and second coupling elements has claws.

8. The shifting device of claim 1 wherein said fork element includes a portion disposed within a slot of said first coupling element.

* * * * *